No. 689,760. Patented Dec. 24, 1901.
I. E. SPANGLER.
CURRYCOMB.
(Application filed Apr. 1, 1901.)
(No Model.)
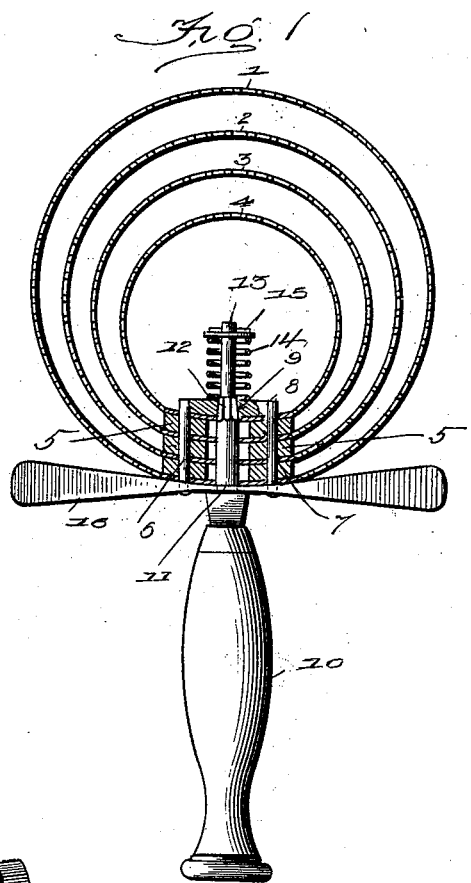
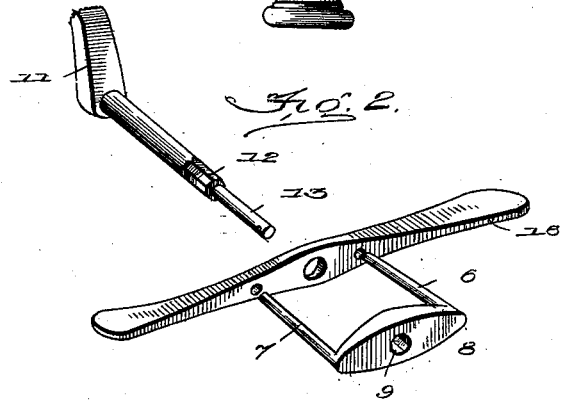
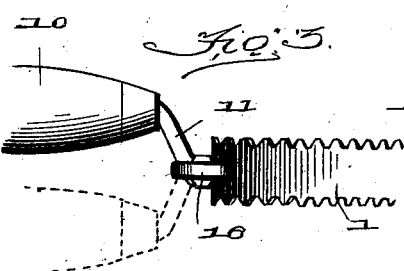

UNITED STATES PATENT OFFICE.

IRA E. SPANGLER, OF KEOKUK, IOWA.

CURRYCOMB.

SPECIFICATION forming part of Letters Patent No. 689,760, dated December 24, 1901.

Application filed April 1, 1901. Serial No. 53,904. (No model.)

*To all whom it may concern:*

Be it known that I, IRA E. SPANGLER, a citizen of the United States, residing at Keokuk, in the county of Lee and State of Iowa, have invented new and useful Improvements in Currycombs, of which the following is a specification.

This invention relates to currycombs; and the primary object thereof is to provide a device which can be readily reversed, as well as to have an adjustable handle, whereby the rubbing blades or combs may be adjusted to any angle with relation thereto. It is a well-known fact that in grooming horses considerable trouble is experienced in removing dust and foreign substances from the animal around the joints on account of the peculiar construction of the currycomb. The operator experiences inconvenience owing to the fact that the handle is continually in the way, and it is the purpose of my invention to evade this defect, as well as to provide a reversible handle, whereby both sides of the comb may be utilized.

With these objects in view my invention consists in the parts and combination of parts, all of which will be described hereinafter, illustrated in the accompanying drawings, and cited in the claims, all of which form a part of this specification.

In the drawings, Figure 1 is a top plan view of a currycomb constructed in accordance with my invention, parts of which are broken away to disclose the handle connection. Fig. 2 is a fragmentary view of the several elements pressing the handle connection, and Fig. 3 is a side elevation of the same.

Referring now to the drawings by reference-numerals, 1, 2, 3, and 4 designate a plurality of approximately concentric rings or bands, forming the teeth or comb portions of the device. These bands are spaced apart by suitable washers 5, of any preferred material and the same perforated, so as to admit the arms 6 and 7 of the yoke-shaped securing member 8. The transverse bar of this member has a conical polygonal opening 9, the purpose of which will be hereinafter explained.

The handle 10 is provided with a shank 11, which passes through alining openings in the several bands or rings, and at a suitable point thereon I provide a polygonal shoulder 12 of the same form as the opening 9, which is adapted to be forced therein by means of the extension 13 and the spring 14, which is fastened thereto by a transverse pin 15 and rests upon the cross-bar of the yoke-shaped member 8. The free ends of the arms 6 and 7 are secured to a transverse bar or knocker 16 to hold the parts in place. Under normal conditions the handle will assume the position shown in Fig. 1. If, however, the operator desires to reverse the same, this can be readily accomplished by grasping the transverse bar 16 with one hand, and by pulling upon the handle 10 with the other the polygonal shoulder of the shank will be unseated from the corresponding opening and the handle can be made to assume the position shown in Fig. 3 in dotted lines. As soon as this position is reached the expansion of the spring will cause the said shank again to be seated, and the device will be ready for use. By reason of the plurality of faces upon the shoulder on the shank and the correspondingly-shaped opening 9 it will be obvious that the blades may be turned at any predetermined angle with relation to the handle 10, thus greatly facilitating the grooming operation.

From the foregoing it will readily be seen that I have provided a cheap, simple, and durable device of the character described, and while I have specifically referred to the several parts which constitute the construction of this invention I would have it understood that I do not limit myself to the exact details of construction shown, but reserve the right to make such changes, alterations, or improvements as would come within the scope of this invention and without departing from the spirit thereof.

What I claim, and desire to secure by Letters Patent, is—

1. In a currycomb, the combination with a plurality of blades, spacing devices therefor, a yoke-shaped connecting device to fasten the blades together, a transverse bar secured thereto, a handle provided with a shank having a polygonal shoulder adapted to be seated within a corresponding opening in the securing devices, whereby the handle may be adjusted to various angles, and means for retaining said shoulder in engagement with the opening.

2. In a currycomb, the combination with a plurality of blades, spacing devices therefor, a yoke-shaped connecting device to fasten the blades together, a transverse bar secured thereto, a handle provided with a shank having a polygonal shoulder adapted to be seated within a corresponding opening in the securing devices whereby the handle may be adjusted to various angles and spring-actuated means for retaining said shoulder in engagement with the opening.

In testimony whereof I affix my signature in presence of two witnesses.

IRA E. SPANGLER.

Witnesses:
WILLIAM TIMBERMAN,
F. A. ASHLEY.